United States Patent

[11] 3,615,283

[72] Inventor Donald D. Lang
 Garden Grove, Calif.
[21] Appl. No. 859,258
[22] Filed Sept. 19, 1969
[45] Patented Oct. 26, 1971
[73] Assignee Spectra-Strip Corporation
 Garden Grove, Calif.

[54] METHOD OF FORMING CONDUCTOR WITH SPACED TERMINAL LOOPS
 7 Claims, 8 Drawing Figs.
[52] U.S. Cl. .................................................. 29/624,
 29/203 R, 156/47, 174/72 TR, 174/117 F
[51] Int. Cl. ...................................................... H01b 7/08,
 H01b 13/00
[50] Field of Search .......................................... 174/72, 72
 R, 117, 117.1, 117.2, 117.11; 179/98; 156/47, 50,
 55; 29/624

[56] References Cited
 UNITED STATES PATENTS
 782,391 2/1905 Hanson ......................... 174/72 R
 857,367 6/1907 Shore et al. .................... 174/72 R
 2,361,374 10/1944 Abbott ........................... 156/55 X
 2,433,346 12/1947 Deakin .......................... 156/47
 3,005,739 10/1961 Lang et al. ..................... 156/47
 FOREIGN PATENTS
 990,640 6/1951 France .......................... 174/72 R
 947,741 1/1964 Great Britain ................ 174/72 R Primary Examiner—Laramie E. Askin
Attorney—I. Morley Drucker, Esq.

ABSTRACT: A conductor with a loose-fitting insulating jacket and having terminal loops pressed therefrom through its insulation by a punch operating from the side opposite the protrusion. The wire is pulled bodily relative to its own insulation as the loop is formed to avoid wire drawing and reduction in cross section of the wire. The insulating jackets of a plurality of wires may be joined in flat, edge relation to form a multiple-wire flat ribbon cable and the loops formed in groups repeated longitudinally of the cable, with the loops in each group extending upwardly at right angles to the plane of the cable and longitudinally and transversely spaced in a staggered pattern. The immediately preceding loop in a wire or cable is used as an anchoring point in the pressing out of a new spaced loop so that the wire is bodily slid within its insulating jacket from the direction in which the newly formed loop is offset from the previously formed loop.

SUCTION TO REMOVE CUT PORTIONS OF INSULATION

PATENTED OCT 26 1971 3,615,283

SUCTION TO REMOVE CUT PORTIONS OF INSULATION

INVENTOR.
DONALD D. LANG
BY Fulwider, Patton, Rieber,
Lee, and Utecht
ATTORNEYS

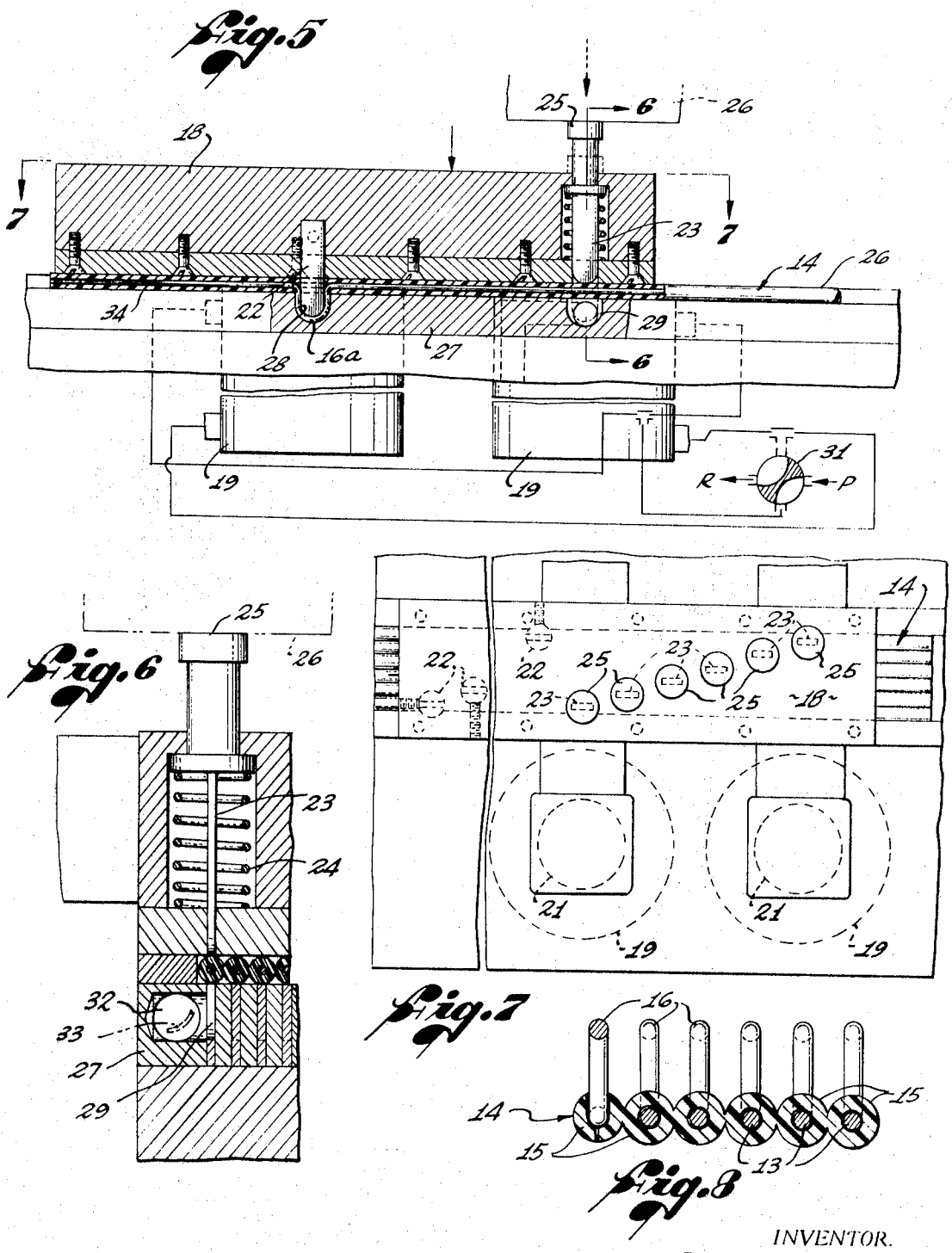

3,615,283

1

METHOD OF FORMING CONDUCTOR WITH SPACED TERMINAL LOOPS

SUMMARY OF THE INVENTION

The wire or cable of this invention is used to connect together electrical terminals, for example, in switching equipment of automatic telephone systems and the like. The invention lies in both a single insulated conductor and in multiple-wire, flat ribbon cable and in the method of forming them. The individual wires have loose-fitting insulating jackets, for example, of polyvinyl chloride, and the cable may be formed by bonding together the insulating jackets of a plurality of parallel wires in a flat ribbon configuration in the manner, for example, disclosed and claimed in U.S. Pat. No. 3,005,739, granted Oct. 24, 1961, for METHOD AND APPARATUS FOR MAKING MULTICONDUCTOR CABLE. The conductor, whether single or in a multiple-wire cable, has terminal loops pressed therefrom at right angles through its insulation from an external punch operating from the side opposite the formed loop. By having the insulating jacket loosely fitting the conductor, it is pulled bodily down the center of its own insulation so that a loop is formed without wire drawing and reduction in cross section. To insure that the wire is slid from the same end thereof as loops are consecutively formed, each formed loop becomes an anchor point while the next succeeding loop is being formed, thereby insuring that the wire is pulled bodily from the end toward which the loops are progressing. The previously formed loop is anchored by engaging it with a punch and die similar to the punch and die which formed the loop and spaced therefrom a fixed distance corresponding to the spacing along the wire of the terminal loops.

A basic object of the invention is to provide an improved, single conductor or multiple-wire, flat ribbon cable having spaced loops pressed through the wire insulation by a punch operating on the side opposite the direction of the protrusion, and without wire drawing or reducing the cross section of the wire at the loop.

A further object of the invention is the method of forming the above conductor and multiple-wire ribbon cable by pressing the loops through the wire insulation while moving the wire bodily within its insulating jacket from an end of the conductor or cable. The method may include anchoring the immediately preceding loop against movement as the immediately following loop is formed, thereby insuring bodily movement of the wire from the same end thereof as the loops are consecutively formed.

Other objects and features of the invention will be apparent from the detailed description.

BRIEF DESCRIPTION OF THE DRAWINGS

FIG. 5 is a view similar to FIGS. 3 and 4 showing the next step in the process with the previously formed loop anchoring the wire;

FIG. 6 is an enlarged detailed sectional view on the line 6—6 of FIG. 5;

FIG. 7 is a plan view of the apparatus on the line 7—7 of FIG. 5; and

FIG. 8 is an enlarged transverse sectional view on the line 8—8 of FIG. 2.

DETAILED DESCRIPTION

Figure 1:
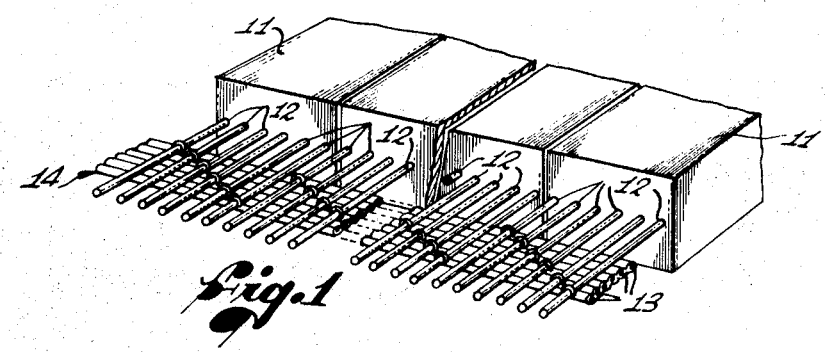
FIG. 1 is a broken perspective view showing multiple terminals of electrical equipment interconnected by terminal loops on a multiple-wire, flat ribbon cable according to the present invention.

While the drawing illustrates a multiple-wire, flat ribbon cable having groups of terminal loops formed therein in spaced relation and with the loops in each group longitudinally and transversely spaced in a staggered pattern, it will be understood that the invention may be exemplified in a single insulated conductor, as well as the multiple-wire cable shown. Furthermore, the apparatus shown in the drawings is not to be considered in any way limiting, as it is a more or less diagrammatic representation of but a simple means which may be used to carry out the method of the invention.

Figure 2:
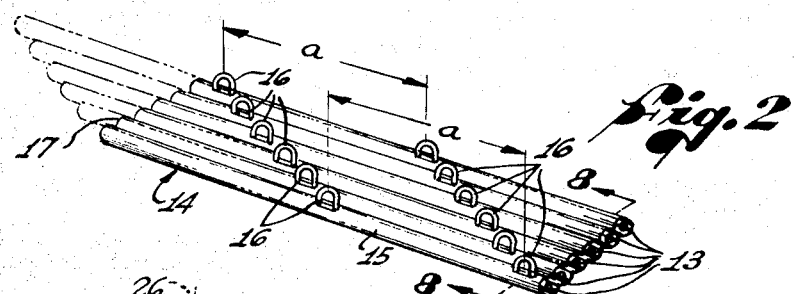
FIG. 2 is an enlarged view of the cable of FIG. 1.

Referring to FIG. 1, there are shown electrical components 11, each having multiple terminals 12, complementary ones of which are connected together by the wires 13 of a multiple-wire flat ribbon cable 14. Each of the wires 13 has an individual insulating jacket 15 which may be of polyvinyl chloride or the like, and which is loose fitting, as shown in FIG. 8, to permit the wires 13 to slid bodily therein. Such loose-fitting jackets are readily available on the market, being formed by slowing down the extrusion process by which they are formed and which themselves form no part of the present invention. When this invention is embodied in a flat ribbon cable, the insulating jackets 15 of the wires 13 may be bonded together, as disclosed in the patent above identified, and the loop forming steps carried out on the plurality of wires of the cable in simultaneous groups. Each wire 13 is provides with spaced loops 16 along its length, the loops being spaced apart a distance $a$ (FIG 2) corresponding to the distance between the complementary terminals 12 on the electrical components 11 which are to be interconnected. In the cable embodiment illustrated in the drawings, the loops in the multiple wires are arranged in longitudinally spaced groups with the loops 16 in each longitudinally and transversely spaced in a staggered pattern, as shown in FIGS. 1 and 2.

A basic concept in the method of this invention lies in pressing a terminal loop transversely of the axis of a conductor through its insulation by a punch operating from the side of the conductor opposite the protrusion. The conductor or cable is first cut to a definite length to accommodate the number of loops or groups of loops which it is desired to have in the finished product, this being substantially the length of the finished product plus the amount of wire which is drawn into the terminal loops. In the initial loop formation for the cable construction, the starting end of the cable is cut at an angle, as indicated in phantom at 16 in FIG. 2, to clear the anchoring punches on the apparatus and to provide material for the initial loop and the loops of the initial group. The portion 16 may be later cropped from the cable, if desired, as indicated at the full line 17 of FIG. 2.

A form of apparatus which may be used in carrying out the method of this invention on the multiple-wire cable has been diagrammatically illustrated in the drawings as comprising a vertically movable head 18, movable to upper and lower positions by four hydraulic actuators 19 having piston rods 21 for holding and manipulating the head. Mounted in the head are a set of staggered fixed punches 22, which serve to anchor the group of immediately prior-formed loops, and a set of staggered punches 23 movable relative to the head 18 to form the new group of terminal loops. The punches 23 are biased to inoperative position by springs 24 and have operating heads 25 adapted to be engaged by a machine head 26.

A die plate 27 has a set of staggered openings 28 in its upper face complementary to the anchoring punches 22 to receive the formed loops and the punches in anchoring relation. The die plate 27 also has a series of staggered die openings 29 complementary to the pressout punches 23 and cooperating therewith to receive the terminal loop pressed from the conductor out through its insulating jacket.

Figure 4:
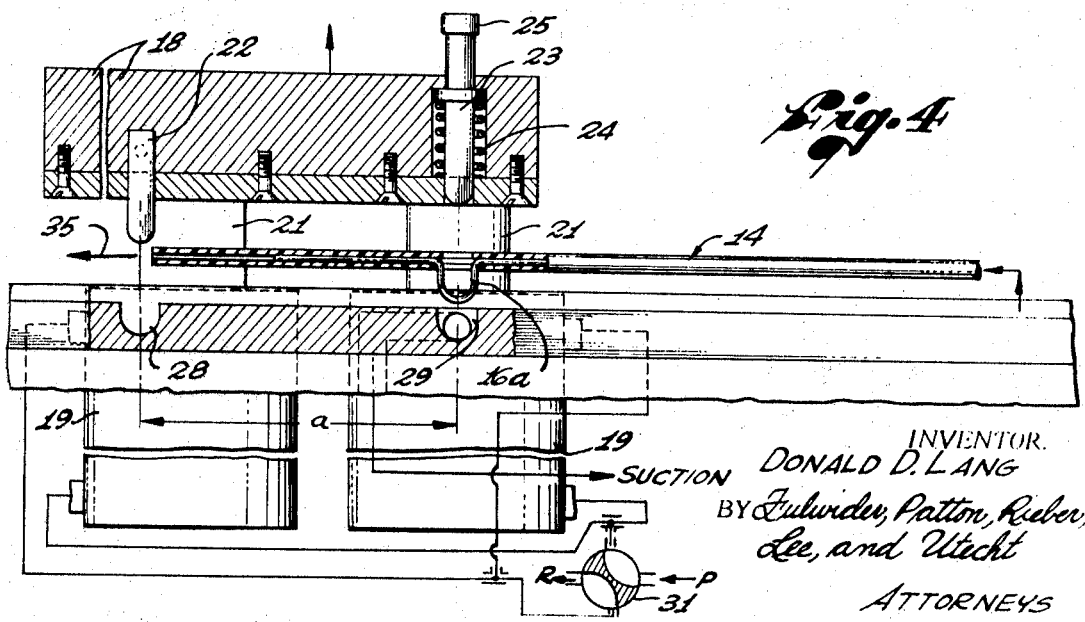
FIG. 4 is a view similar to FIG. 3 showing another operating step in the process where the wire loop is separated from the punch and die.

The hydraulic actuators 19 are shown in FIGS. 4 and 5 connected by a valve 31 to a source of pressure P and to a reservoir line R. The die plate 27 is shown with suction lines 32 for removing the cutout portions of the insulation from directly beneath the loops 16, such portions being indicated at 33 in FIG. 6.

Figure 3:
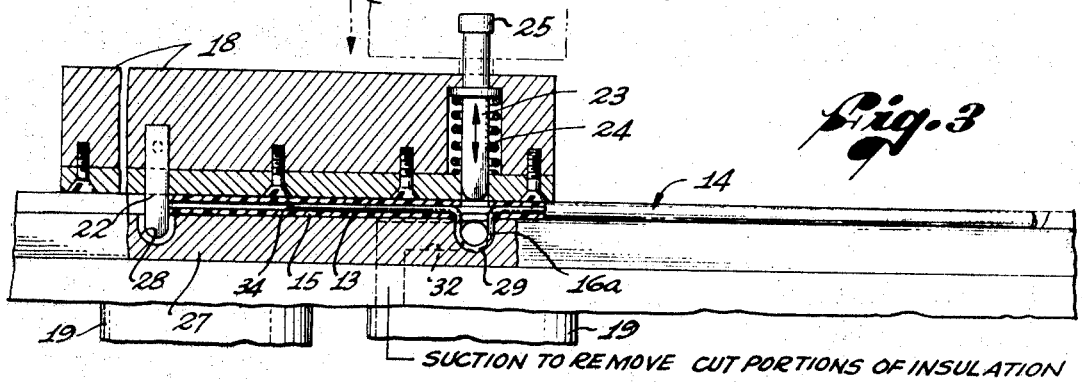
FIG. 3 is a diagrammatic, partially sectional view of the formation of the initial loop in a wire or cable.

The method of forming the terminal loops on the conductor of cable according to the present invention will be described in connection with the more or less diagrammatic showing of the drawings. As previously stated, the conductor or cable is first cut to the length which will provide the desired number of terminal loops therealong and the end of the conductor or cable is placed adjacent the die opening 28 so that it will just clear the anchoring punch 22 in the formation of the initial loop or group of loops. This is illustrated in FIG. 3 where the end of the conductor jacket 15 is shown engaging the anchoring punch, while the end of the conductor has been drawn to the position 34 by the formation of the loop 16a by the punch 23. It is only the initial group which draws the wire from this end of the conductor, all succeeding loops being formed by bodily drawing the wire through its insulating jacket from the opposite end. Referring still to FIG. 3, the initial loop was therefore formed by positioning the conductor or cable on the die plate 27, lowering the head 18 to clamp the conductor or cable, then lowering the head 26 to move the punch 23 into the die opening 29 and form the wire loop 16a. For the cable, a plurality of staggered punches, shown in FIG. 7, are moved simultaneously.

When this is completed, the machine head 26 is raised and the hydraulic actuators 19 energized to move the head 18 upwardly, thereby removing the punches 22 and 23 and permitting the conductor or cable 14 to be raised from the die plate 27 to the position shown in FIG. 4. Either the punch apparatus of the cable is now moved, the latter being indicated by the arrow 35, it being only required that there be relative movement therebetween so as to locate the loops 16a at the die openings 28, as in the position of FIG. 5. In this FIG., the anchoring punch 22 presses the loop 16a into the die plate opening 28 so as to anchor the adjacent end of the wire at 34 within its insulating jacket. Now, as the punch 23 is moved downwardly by the machine head 26, it forces a loop of wire into the die opening 29, and in so doing, moves the wire bodily from the end of the wire indicated at 26 in FIG. 5, that is, from the side toward which the loops are consecutively formed.

The operation of forming the loops continues consecutively in the manner illustrated in FIGS. 3–5, with each newly formed loop engaged by an anchoring punch 22 in a die plate opening 28, while a new loop is being formed by a punch 23 in die plate opening 29, and with the wire always slidably moved within its jacket from the direction of offset of the newly formed loop from the loops previously formed. When the last loop is formed, the end of the conductor or cable is trimmed by cropping the now empty insulation therefrom.

The above description applies equally as well to a single conductor as to a multiple-wire cable, and the invention is to be construed as of commensurate breadth. In the case of the multiple-wire cable, anchoring punches 22 and pressout punches 23 are disposed in staggered relation complementary to the loops 16 shown in FIG. 2. Such staggering of the punches is illustrated in the plan view of FIG. 7, it being understood that the punches are staggered to produce the loop formations of FIG. 2, where the groups of loops are spaced longitudinally of the cable and with the loops in each group longitudinally and transversely spaced in a staggered pattern.

As the punch 23 presses out a terminal loop 16 from a wire, it slices through the insulation at the back of the loop, but actually cuts out a small section of insulation forwardly of the loop. Such cutout portions are indicated at 33 in FIG. 6, and are shown immediately beneath the loops 16 in FIG. 2. The back of the insulating jacket where the punch sliced through is not cut out, but simply cut through so that upon removal of both punches, it tends to swell and return to its insulating position with only a small slit therethrough.

It is desired that this invention, both as to the article and the method of making it, be independent of the sizes and materials of the conductors, cable, loops, insulation, etc. By way of example only, and without limitation, the conductor may be a No. 26 AWG tinned and annealed copper wire with a polyvinyl chloride, loose, insulating jacket. In cable form there have been illustrated six wires, although any desired number may be used. The loops may be of substantially 0.088 in. internal diameter, and have their center lines 0.209 inch apart. In the six-wire configuration of the cable, the loops in any one individual wire are substantially 1.255 in. apart. These dimensions are substantially determined by the size, number, and spacing of the component terminals to be connected. The length of the conductor cable will be determined by the number of groups of loops which are disposed along its length.

While a certain specific article and method of forming the same have been described herein, it is understood that the invention is not limited thereto, as many variations will be apparent to those skilled in the art.

I claim:

1. The method of forming an insulated conductor with a plurality of bare terminal loops spaced along its length comprising:
   providing a wire conductor with a loose-fitting insulating jacket within which the wire is bodily movable;
   pressing a terminal loop from the wire out through its insulation by a punch moving transversely of the wire from the side opposite the direction of protrusion; and
   pulling the material for the loop by bodily moving the wire within its insulation so as to avoid wire drawing and reduction of cross section.

2. The method defined in claim 1, including:
   consecutively forming said loops at spaced intervals along the length of the wire while always sliding the wire from the same end by anchoring each immediately previously formed loop while the next succeeding loop is being pressed out.

3. The method defined in claim 1, including:
   joining together a plurality of said wires into a multiple-wire, flat ribbon cable prior to the pressing out of the terminal loops therefrom; and
   forming said loops in groups spaced longitudinally of the cable and with the terminal loops in each group formed simultaneously in longitudinally and transversely spaced relation in a staggered pattern.

4. The method of forming an insulated conductor with at least one bare terminal loop comprising:
   providing a wire conductor with a loose-fitting insulating surrounding layer within which said wire is movable; and
   pressing a terminal loop from said wire out through its insulation by punch means moving transversely of the wire from the side opposite the direction of protrusion while pulling the material for the loop by moving the wire within its insulation so as to avoid wire drawing and reduction of cross section.

5. The method defined in claim 4, including:
   consecutively forming a plurality of said loops at spaced intervals along the length of the wire while always sliding the wire from the same end by anchoring each immediately previously formed loop while the next succeeding loop is being pressed out.

6. The method defined in claim 4 including:
   joining insulated wire conductors into flat cable prior to the pressing out of any terminal loops therefrom.

7. The method defined in claim 4 including:
   joining insulated wire conductors into flat ribbon cable prior to the pressing out of any terminal loops therefrom; and thereafter, forming a plurality of loops in groups spaced longitudinally of the cable and with the terminal loops in each group formed simultaneously in spaced relation.